(12) United States Patent
Blaak et al.

(10) Patent No.: US 7,503,816 B2
(45) Date of Patent: Mar. 17, 2009

(54) CONNECTION SYSTEM, IN PARTICULAR A PLUG-IN CONNECTION SYSTEM FOR THE TRANSMISSION OF DATA AND POWER SUPPLY SIGNALS

(75) Inventors: Holger Blaak, Berlin (DE); Wolfgang Feucht, Berlin (DE); Jörg Giebson, Satzkorn (DE)

(73) Assignee: Knick Elektronische Messgeraete GmbH & Co., KG, Berlin (DE)

( * ) Notice: Subject to any disclaimer, the term of this patent is extended or adjusted under 35 U.S.C. 154(b) by 213 days.

(21) Appl. No.: 11/671,669

(22) Filed: Feb. 6, 2007

(65) Prior Publication Data

US 2007/0184704 A1    Aug. 9, 2007

(30) Foreign Application Priority Data

Feb. 8, 2006    (DE) .................... 10 2006 005 632

(51) Int. Cl.
  *H01R 9/22*    (2006.01)
(52) U.S. Cl. ......................................... 439/950
(58) Field of Classification Search ............... 439/950
  See application file for complete search history.

(56) References Cited

U.S. PATENT DOCUMENTS

| | | | | |
|---|---|---|---|---|
| 3,995,209 | A | * | 11/1976 | Weston ........................ 323/355 |
| 6,476,520 | B1 | * | 11/2002 | Bohm et al. ................. 307/104 |
| 6,705,898 | B2 | * | 3/2004 | Pechstein et al. ............ 439/660 |
| 2005/0194296 | A1 | | 9/2005 | Lin |

FOREIGN PATENT DOCUMENTS

| | | |
|---|---|---|
| DE | 195 40 854 A1 | 5/1997 |
| DE | 197 19 730 C1 | 10/1998 |
| DE | 198 02 462 A1 | 9/1999 |
| DE | 199 05 952 A1 | 9/2000 |
| DE | 100 55 090 A1 | 5/2002 |
| DE | 101 07 100 A1 | 12/2002 |
| DE | 103 13 639 A1 | 10/2004 |

\* cited by examiner

*Primary Examiner*—Truc T Nguyen
(74) *Attorney, Agent, or Firm*—McGlew and Tuttle, P.C.

(57) ABSTRACT

A connection system for the preferably contactless transmission of data and power supply signals between a sensor means and a base unit in a measuring and transmission system comprises a sensor-side and a base-side connection element. An input unit is provided on at least one of the connection elements for inputting sensor-relevant commands.

12 Claims, 2 Drawing Sheets

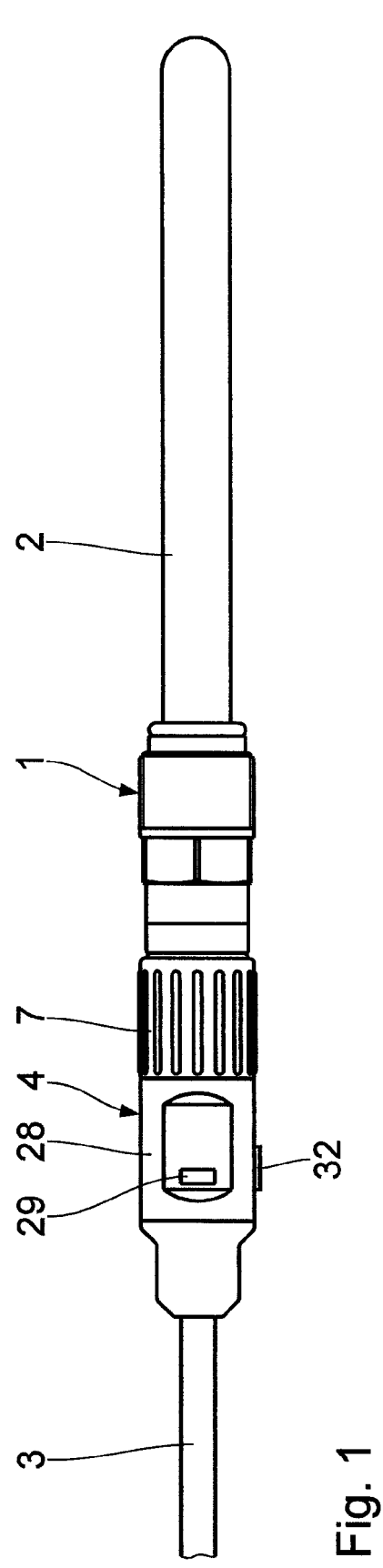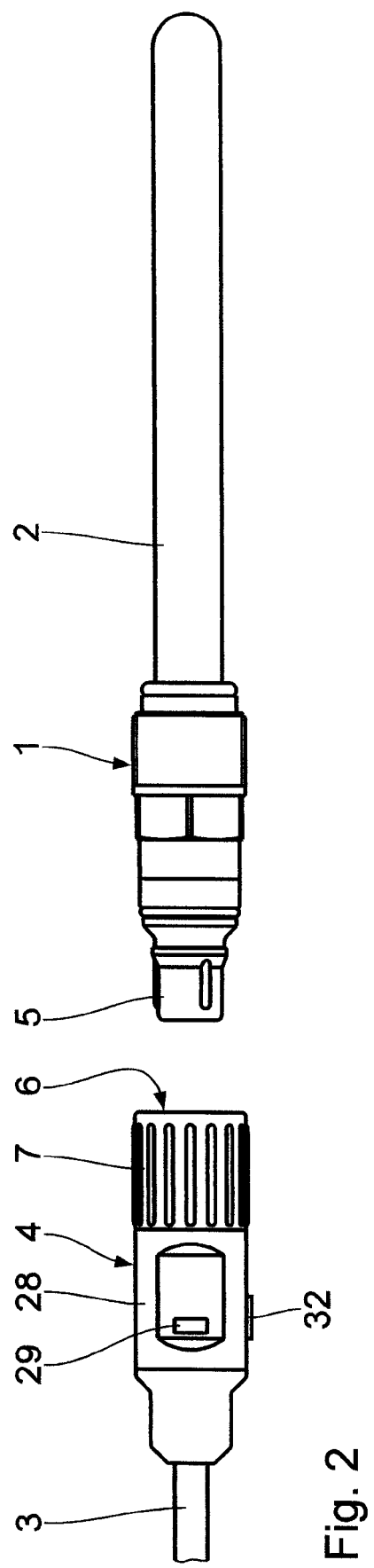
Fig. 1
Fig. 2

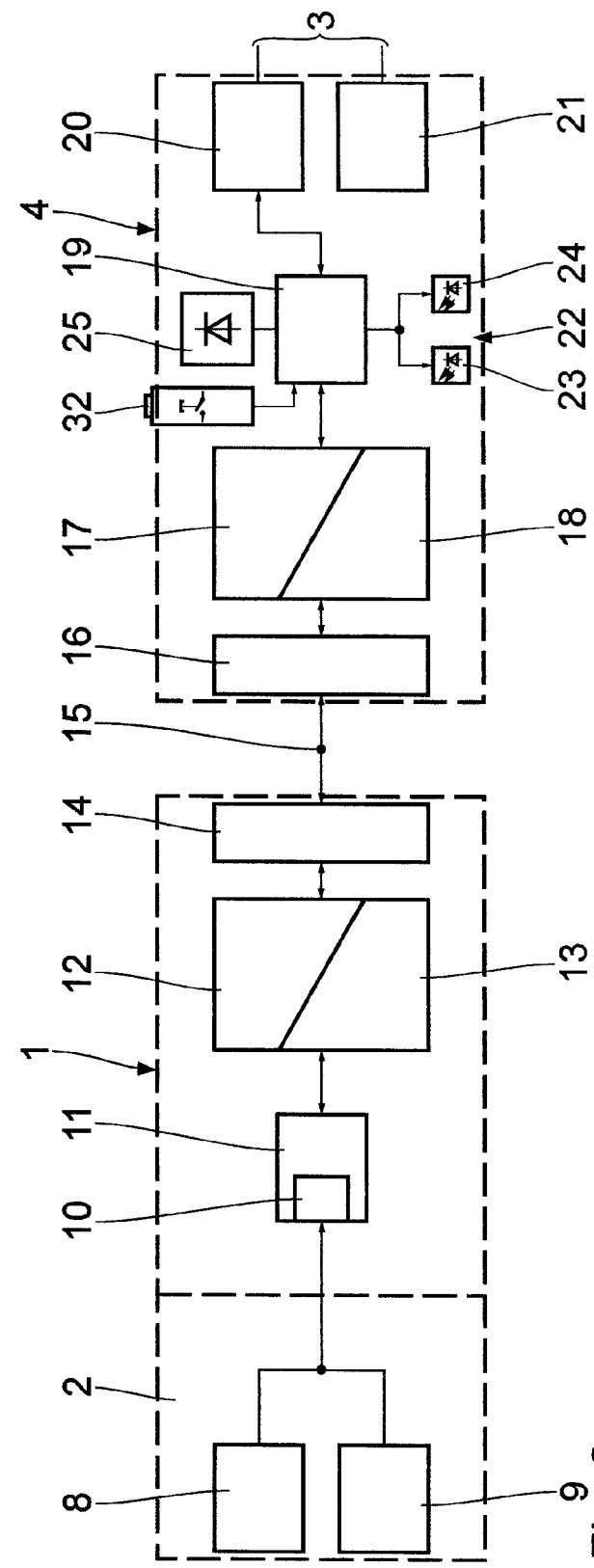
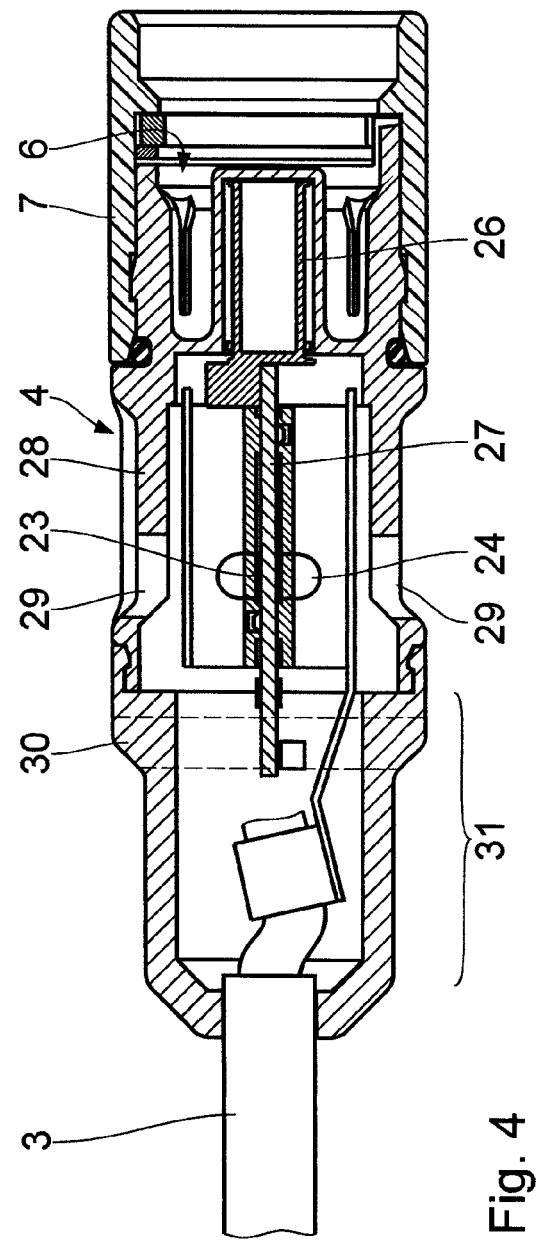
Fig. 3
Fig. 4

CONNECTION SYSTEM, IN PARTICULAR A PLUG-IN CONNECTION SYSTEM FOR THE TRANSMISSION OF DATA AND POWER SUPPLY SIGNALS

BACKGROUND OF THE INVENTION

1. Field of the Invention

The invention relates to a connection system, and in particular to a plug-in connection system for the transmission of data and power supply signals between a sensor means and a base unit in a measuring and transmission system. The term "connection system" as used in the present invention encompasses all possible coupling mechanisms which can be mechanically and electrically connected and isolated, plug connectors comprising a plug and socket element obviously being the most conventional examples of connectors of this type in electrical engineering.

2. Background Art

The contactless transmission of switch signals and AC voltages in telecommunications and data transmission systems is known from DE 195 40 854 A1, for example, in the form of an electromagnetic multiple coupler. The non-contact and passive transmission means of the multiple coupler used in this case supersede plug-in connections and allow electrical isolation of the electrical signals between, for example, a telecommunications and data transmission engineering main device and an external operator device such as is to be used, for example, in fields of application in which there is a risk of explosions such as fuel depots, oil conveying plants and oil refining plants.

DE 100 55 090 A1 discloses a plug-in connection system for connecting a transmission line to a sensor, which system also operates in a contactless manner and is provided with plug-internal electronics. The signals are transmitted inductively, the transmitted signal comprising a supply voltage signal and measurement signal in superimposed form.

The closest prior art is represented by DE 197 19 730 C1 which also relates to a plug-in connection system for the contactless transmission of data and power supply signals between a sensor means and a base unit in a measuring and transmission system. In this case, a sensor means, for example for a temperature probe, is coupled to a sensor-side plug-in connection element. The sensor means has a certain "intelligence", as it has an A-D converter for the measurement signal of the thermocouple representing the measuring sensor and a microprocessor-assisted control and memory unit connected downstream thereof. In the sensor-side plug-in connection element, which is coupled to the sensor means, there is provided a data modulator/demodulator unit in combination with a power signal receiver, which unit is connected to a first coupling partner element of an inductive coupling for the contactless transmission of data and power supply signals. The second coupling partner element of the inductive coupling path is located in the base-side plug-in connection element which is linked, for the purposes of the supply of data and power, to the corresponding lines of a bus system. In this base-side plug-in connection element there is provided, again in combination, a data modulator/demodulator unit with a power signal transmitter, which unit powers the sensor system via the primary current supply originating from the bus system.

With regard to the invention, it should be noted that measuring and transmission systems of this type are often used in a harsh industrial environment such as, for example, in large-scale chemical processing plant. The measuring points are in such cases frequently far removed from the central control room. This gives rise to the problem that there is no direct possibility for the process operators to intervene on site at a measuring point on detection of an error state or a non-uniformity. Examples of such intervention include a calibration process on an electrochemical measuring sensor such as a pH probe.

SUMMARY OF THE INVENTION

Starting herefrom, the object of the invention is to specify a connection system, and in particular a plug-in connection system for the preferably contactless transmission of data and power supply signals, wherein the process operators can intervene at the site of the connection system itself.

This object is achieved by a connection system according to the invention comprising a sensor-side connection element with a power signal receiver, a data modulator/demodulator unit which can be coupled at least indirectly, for the purposes of signalling, to at least one measuring sensor of the sensor means, as well as a first coupling partner element for the preferably contactless transmission of data and power supply signals via a coupling path, a base-side connection element with a second coupling partner element of the coupling path, a power signal transmitter, a data modulator/demodulator unit, a data interface which can be connected to the base unit with respect to data, as well as a primary power supply, and a microprocessor-assisted control and memory unit in at least one of the connection elements, and an input unit on at least one of the connection elements for inputting sensor-relevant commands. This input unit can, for example, be a simple key button with which, for example, there can be input a signal for starting a process for calibrating the electrochemical sensor means coupled to the connection system. Test routines for determining the state of the sensor can even be initiated by actuating the input unit. Further variations of the input unit can, for example, be a magnetic switch or an electromagnetically operating transmission means such as, for example, an RFID chip or an IrDA interface. Input via a fingerprint sensor would also be possible, thus facilitating, for example, user detection or access authorisation. Seamless traceability of the instances of access to the system (known as an audit trail) is also provided.

According to a further preferred embodiment, the connection system can have an optical display unit by means of which a command-relevant message can be displayed. This may be—as is disclosed in the patent application filed simultaneously by the Applicant and having the identical title "Connection system, in particular a plug-in connection system for the transmission of data and power supply signals"—an optical diagnosis display unit for displaying state parameters within the measuring and transmission system. This diagnosis display unit allows the process operators to detect on site, for example on the basis of a test routine carried out, the need for calibration of the sensor means. Using the input unit proposed in accordance with the present invention, the operators can then, at the connection system itself, issue the command to carry out the above-mentioned calibration process. The carrying-out of the calibration and the successful completion thereof can, in turn, then also be displayed via the optical display unit in the form of command-relevant feedback.

In principle, the optical diagnosis display unit can be based on one or more light-emitting diodes, wherein differing state parameters of the measuring and transmission system can be displayed by differing colouring and/or flash frequencies of the display signal. A plurality of light-emitting diodes, corresponding to the basic colours red, blue and green, may thus also be provided in the optical diagnosis display unit. These diodes can be activated, in accordance with the principle of the additive mixture of colours, to generate a display signal of any colour.

In the case of a pH measuring point, for example, the colour of the light-emitting diode module could be activated as a function of the measured hydrogen ion concentration. The optical diagnosis display unit can thus be based on what is known as the litmus test. If a low pH is measured, the optical diagnosis display unit is lit up red; if a high pH is measured, the unit is lit up blue.

Other optical displays such as, for example, LCD displays, which optionally output error or status codes or in the manner of plain-text messages, can also be used.

In a further preferred embodiment, the connection system can additionally be equipped with an interface for the wireless communication of data to a separate entity such as, for example, a PDA, MDA, PC laptop and the like. The interface may be in the form of a radio or infrared interface, infrared transmission (IrDA) displaying significant advantages, such as low power consumption, highly secure transmission of data through the direct optical transmission route and a simple connection construction, over radio solutions such as, for example, Bluetooth. Furthermore, an interface of this type is nowadays part of the basic equipment of many communications devices.

Further features, advantages and details of the subject-matter of the invention will emerge from the following description in which an embodiment is described in detail with reference to the appended drawings:

BRIEF DESCRIPTION OF THE DRAWINGS

FIGS. 1 and 2 are side views of a plug-in connection system in the coupled and detached states, FIG. 3 is a block diagram of the internal construction of the plug-in connection system, and FIG. 4 is an axial section of a socket element of the plug-in connection system.

DESCRIPTION OF THE PREFERRED EMBODIMENT

The plug-in connection system shown in FIGS. 1 and 2 comprises a sensor-side plug element 1 to which there is directly fastened a sensor means 2 shown schematically in the present case to be tubular. This means may, for example, be a pH probe comprising a temperature detection means, but also any other type of sensor such as, for example, an oxygen or conductivity probe. The sensor means 2 is positioned in this case in the process to be monitored. In order to forward the measurement data to a corresponding base unit, such as for example a field bus device, a data and supply line 3 is linked to the field bus device via the plug-in connection system according to the invention. The data line could in this case also be in the form of a two-wire bus line. The socket element 4, which comprises a recess 6, the shape of which is adapted to the plug-in portion 5 of the plug element 1, for mechanical and inductive coupling between the plug element 1 and socket element 2, cooperates in this case with the plug element 1. The engagement, which will not be described in detail, between the plug element 1 and the socket element 4 is cancelled by a release sleeve 7, thus allowing the plug-in connection system to be brought into the uncoupled position shown in FIG. 2.

FIGS. 3 and 4 show the functional construction of the plug-in connection system comprising the plug element 1 and the socket element 4. The sensor means 2 thus comprises, for example, an elementary sensor 8 for detecting a pH and/or a redox potential of a process liquid and an elementary sensor 9 for detecting the temperature of the process liquid. Both sensors 8, 9 supply a respective analogue voltage signal which is issued to the A-D converter 10 linked, for the purposes of signalling, to the plug element. The plug element is integrated into a microcontroller 11 which, as the central control and memory unit, is functionally responsible in a known manner for the basic controlling, the processing of command and measurement data and the forwarding thereof.

Also provided in the plug element 1 is circuitry comprising the power signal transmitter 12, data modulator/demodulator unit 13 and a first coupling partner element 14 for the inductive contactless coupling path 15 between the plug element 1 and socket element 4.

The second coupling partner element 16 is arranged at its head side on the socket element 4 and is connected to circuitry consisting of the power signal transmitter 17 and modulator/demodulator unit 18. In the socket element 4, as in the plug element 1, a microcontroller 19 takes over the central control and memory outputs in conjunction with the power supply and the data exchange of the plug-in connection system. The data is exchanged via an RS 485 modem, as the data interface 20, to a base unit (not shown in detail) such as, for example, a Profibus field device. Finally, the entire plug-in connection unit is powered via a primary current supply 21. The plug-in connection system as a whole, including the sensor means 2, is in compliance with the explosion prevention regulations.

Finally, there is provided in the socket element 4 an optical diagnosis display unit (denoted in its entirety by reference numeral 22) which is activated by the microcontroller 19 and comprises, in the embodiment shown in the present case, two light-emitting diodes 23, 24. These two light-emitting diodes 23, 24 are used in a manner to be discussed in detail hereinafter to display state parameters within the measuring and transmission system.

Before this is considered, the basic mode of operation of the plug-in connection system, such as is known per se from the prior art, will briefly be outlined. Starting from the sensor side, the analogue signals supplied by the two elementary sensors 8, 9 are digitised in the A-D converter 10. The microcontroller 11 calculates the corresponding measured values and outputs these to the portion of the circuit embodying the power signal receiver 12 and the modulator/demodulator unit 13. This portion of the circuit converts the digital information via the measured values into a modulation suitable for transmission via the inductive coupling path 15; examples of such modulation include amplitude, frequency or phase modulation. On the side of the socket element 4, the corresponding digital information is filtered out by the modulator/demodulator unit 18 and transmitted via the data interface 20 and the bus line 3 to a field device for further processing. The microcontroller 19 controls in this case the flow of data by switching, for example, the data interface 20 from Receive to Send.

For powering the plug-in connection system as a whole, the power signal transmitter 17 comprising the modulator/demodulator unit 18 is controlled in such a way, starting from the base-side primary current supply 21 via the microcontroller 19, that, in addition to modulated data signals used, for example, for parametrising the sensor means 2, power supply signals, i.e. for example a carrier voltage, are transmitted via the coupling path 15. The carrier voltage is processed by the power signal receiver 12 comprising the modulator/demodulator unit 13 in such a way that the components in the plug element 1 can be fully powered.

Also provided is a diagnosis display unit 22 which is controlled by the microcontroller 19 and serves as a status display for displaying state parameters at the plug-in connection system itself. Simple on-site diagnosis of the measuring system provided in the plug-in connection system is thus possible.

The orderly state of the power supply can thus be signalled, for example, by continuous illumination of the green light-emitting diode 23 and a drop in voltage or insufficient power supply as a result of this LED 23 being switched off. Correct data transmission within the plug-in connection system via the plug element 1 and socket element 4 and correct transmission of data between the plug-in connection system itself and the field device, as the superordinate base unit, can be signalled by flashing of the green light-emitting diode 23. Defective transmission of data between the communication partners described can, for example, be represented by continuous or flashing illumination of the red light-emitting diode 24.

Further state parameters which can be displayed include, for example, the status of the sensor. For this purpose, the plug element contains means for monitoring operation. In the case of ion-sensitive sensors, for example, which generally consist of a high-resistance measuring electrode and a relatively low-resistance reference electrode, the internal resistance of the electrode is accordingly measured by superimposing test voltages on the DC measurement signals themselves. The impedance of the high-resistance measuring electrode or the reference electrode can be calculated from the relationship between the output voltage and test voltage. This calculation can be carried out by the microcontrollers 11 and 19 in the plug-in connection system itself or in a separate base unit such as the field device. If the calculated internal resistance exceeds or falls below defined limits, this is an indication that an error has occurred in one of the electrodes. This check is generally carried out in the field device which, in the event of an error, generates a corresponding error message and forwards the message to the socket element 4 of the plug-in connection system via the data interface 20. The microcontroller 19 of the plug-in connection system is then able to activate the red light-emitting diode 24. Differing causes of error, such as disturbance of the data transmission or electrode errors, can then be visually represented by differing flash frequencies of the light-emitting diode 24.

Errors and/or diagnosis limits can also be checked directly in the plug-in connection system via the microcontrollers 11, 19 thereof. The plug-in connection system is thus able to generate error messages independently of the field device and also to display the messages by means of the light-emitting diodes 23, 24.

Moreover, the light-emitting diodes 23, 24 can also be used for transmitting information data. For this purpose, the diodes are activated by the microcontroller 19 in such a way that the visible LED light is additionally modulated for the transmission of data. Examples of the form of modulation include, again, amplitude, frequency or phase modulation. This data can then be extracted from the LED signal and further evaluated using an additional device.

Finally, FIG. 3 shows in the socket element 4 a further separate data interface 25 in the form of an IrDA infrared interface.

The inner mechanical construction of the socket element 4 will be described with reference to FIG. 4. The second coupling partner element 16, in the form of an indicated induction coil 26, is thus configured as the core of the annular recess 6 for the plug-in portion 5. When the plug-in portion 5 is plugged in, a corresponding annular coil in the head of the plug-in portion 5 comes to lie radially outside the induction coil 26, thus forming the coupling path 15.

The electronic components of the socket element 4, as were described with reference to FIG. 3, are arranged on a central printed circuit board 27 in the housing 28 of the socket element 4. These components also include the two light-emitting diodes 23, 24, the light signals of which may be seen via the window 29 in the housing 28 of the socket element 4. The transmission of light between the LEDs 23, 24 and the window 29 can be improved via optical waveguides (not illustrated in detail) in the form, for example, of Y-shaped plastics material bodies. In general, it must be ensured that all of the light-emitting components in the socket element 4 facilitate an exchange of light or radiation via corresponding windows in the housing 28. Indicated by broken lines in FIG. 4, by way of example, is an annular window 30 in the rear housing portion 31, via which window the light from light-emitting diodes (not illustrated in detail) can be irradiated in all radial directions.

As may be seen in FIGS. 1, 2 and 3, the socket element 4 has on its housing 28, as the core of the present invention, a button 32 which is connected to the microcontroller 19. This button 32 can be used for inputting into the system the sensor-relevant commands mentioned at the outset such as, for example, the command to carry out a calibration. This command is forwarded via the microcontroller 19 and the data interface 20 to the remote control room which is then able to control the sequence of the calibration. Alternatively thereto, the microcontrollers 19, 11 can also have the corresponding "intelligence", so the calibration control is carried out therefrom. The calibration process can be displayed, for example, by high-frequency flashing of the red LED 24; successful completion of the calibration process can be indicated by high-frequency flashing of the green LED 23.

If the calibration is carried out via a fingerprint sensor, calibration data can be deposited directly in the plug-in system on a personal basis—as is required in audit trail logging. An audit trail allows it to be checked precisely who processed which calibration and/or which error message and at what time. This information can, for example, be displayed and/or evaluated by the superordinate unit, for example a field device.

What is claimed is:

1. Connection system, in particular a plug-in connection system for the transmission of data and power supply signals between a sensor means (2) and a base unit in a measuring and transmission system, comprising
   a sensor-side connection element (1) with
      a power signal receiver (12),
      a data modulator/demodulator unit (13) which can be coupled at least indirectly, for the purposes of signalling, to at least one measuring sensor (8, 9) of the sensor means, as well as
      a first coupling partner element (14) for the preferably contactless transmission of data and power supply signals via a coupling path (15),
   a base-side connection element (4) with
      a second coupling partner element (16) of the coupling path (15),
      a power signal transmitter (17),
      a data modulator/demodulator unit (18),
      a data interface (20) which can be connected to the base unit with respect to data, as well as
      a primary power supply (21),
   a microprocessor-assisted control and memory unit (19) in at least one of the connection elements (1, 4), and an input unit (32) on at least one of the connection elements (4) for inputting sensor-relevant commands.

2. Connection system according to claim 1 for an electrochemical sensor means, wherein a signal for starting a calibration process on the sensor means can be input using the input unit (32).

3. Connection system according to claim 1, wherein test routines for determining the state of the sensor can be initiated by actuating the input unit (32).

4. Connection system according to claim 1, wherein the input unit is a key button (32).

5. Connection system according claim 1, wherein the input unit is a magnetic switch.

6. Connection system according to claim 1, wherein the input unit is a fingerprint sensor.

7. Connection system according to claim 1, wherein the input unit is an electromagnetically operating transmission means.

8. Connection system according to claim 1, comprising an optical display unit (22) by means of which a command-relevant message can be displayed.

9. Connection system according to claim 1, comprising a further interface (25) for the wireless communication of data to a separate entity.

10. Connection system according to claim 1, wherein for configuring the connection system as a plug-in connection system, the sensor-side connection element is a plug element (1) and the sensor-remote connection element is a socket element (4) or vice versa.

11. Connection system according to claim 1, wherein the sensor-side connection element (1) and the sensor means (2) are rigidly connected to each other.

12. Connection system according to claim 1, wherein a microprocessor-supported control and memory unit (11, 19) is provided in both connection elements (1, 4).

* * * * *